United States Patent
Rangan

[11] Patent Number: 5,999,166
[45] Date of Patent: Dec. 7, 1999

[54] APPARATUS AND METHOD FOR OPTICALLY MODULATING ELECTRONIC SIGNALS AND COMPUTER DATA

[76] Inventor: Karur S. Rangan, 36 Aberfeldy Crescent, Thornhill, Ontario, Canada, L3T 4C2

[21] Appl. No.: 08/833,789

[22] Filed: Apr. 9, 1997

Related U.S. Application Data

[60] Provisional application No. 60/015,036, Apr. 9, 1996.

[51] Int. Cl.⁶ ...................................................... G09G 5/08
[52] U.S. Cl. .......................... 345/157; 345/158; 345/163; 345/166
[58] Field of Search ...................................... 345/156, 157, 345/158, 159, 162, 163, 166, 175, 176

[56] References Cited

U.S. PATENT DOCUMENTS

| | | | |
|---|---|---|---|
| 5,181,181 | 1/1993 | Glynn ....................................... | 345/163 |
| 5,506,605 | 4/1996 | Paley ........................................ | 345/158 |
| 5,706,026 | 1/1998 | Kent et al. ............................... | 345/156 |
| 5,734,375 | 3/1998 | Knox et al. .............................. | 345/175 |
| 5,739,812 | 4/1998 | Mochizuki et al. .................... | 345/163 |

FOREIGN PATENT DOCUMENTS

WO88/04060   6/1988   WIPO.

OTHER PUBLICATIONS

Microsoft Press, Computer Dictionary The Comprehensive Standard for Business, School, Library, and Home (2$^{nd}$ Edition); Apr. 1, 1995; pp. 280–281.

*Primary Examiner*—Vijay Shankar
*Attorney, Agent, or Firm*—Carr & Ferrell LLP

[57] ABSTRACT

A light source for generating a light beam which can be focused in many different directions or varied in intensity under control of a user's hand. A light sensor for detecting the focused light beam and generating a sensor signal based on either the light beam's area of coverage on the light sensor or the light beam's intensity. A modulation apparatus for receiving the sensor signal and in response modulating a computer variable and/or an electronic signal. A freeze circuit for inhibiting modulation when the sensor signal either exceeds or falls below a predetermined maximum or minimum level.

34 Claims, 13 Drawing Sheets

APPARATUS AND METHOD FOR OPTICALLY MODULATING ELECTRONIC SIGNALS AND COMPUTER DATA

REFERENCE TO PROVISIONAL APPLICATIONS TO CLAIM PRIORITY

This application claims priority in provisional application filed on Apr. 9, 1996, the first entitled "Three Dimensional Tracking Device," Ser. No. 60/015,036, by inventor Karur S. Rangan.

BACKGROUND OF THE INVENTION

1. Field of the Invention

The present invention pertains generally to tracking devices. More particularly the present invention pertains to an optical tracking device for use in a computer and/or electronic control system.

2. Discussion of Background Art

Two Dimensional (2D) Tracking Devices

Currently, some of the 2D tracking devices used to move a cursor on a computer display or within an electronic control system are a Mouse, a Track-Ball, a Track-Stick, and an Electro-Static Sensor. While these system all can move the cursor, they are ergonomically inefficient since they require the small muscles of a user's hand and wrist to continuously work in order to move the mouse, spin the track ball, move the track stick, or drag a finger on the electro-static surface. As a result, when these devices are used for more than a short time the user's hand and wrist muscles become fatigued and pain can result. Prolonged use may lead to repetitive strain injuries.

Three Dimensional (3D) Tracking Devices

Many 3D tracking devices not only suffer from the 2D tracking device problems described above, but also require that the user activate buttons or additional keyboard controls to achieve 3D cursor movement. Since such systems lack simultaneous cursor control in all three degrees of freedom, an unnatural and awkward interface is presented to a user.

For example, a track-ball by itself only allows motion in 4 directions (side-to-side, and back-to-front) resulting in only two degrees of motion. The track-ball requires an additional button for generating any up-and-down cursor movement (i.e. pressing the left button and rolling the track ball forward can be used to move the cursor up-and-down). Track-sticks with a vertical position slide type of device have also been used; however, these devices lack precision in controlling the vertical position, are too large for laptop computers, and require that a user's hand be totally dedicated to the track-stick, thus restricting the user's ability to maintain control of the cursor while moving a hand between a key board and the track-stick.

Other 3D tracking devices, such as those that use gloves or other sensors which measure electrical properties such as resistance and parameterize them to generate location and motion data, provide a more natural feel to the user, but are typically very bulky, are difficult to use, and are quite expensive.

What is needed is a less expensive and more ergonomically efficient apparatus and method for 3D tracking.

SUMMARY OF THE INVENTION

The present invention is an apparatus and method for optically modulating electronic signals and computer data. Within the apparatus of the present invention, a light source is used to generate a light beam which can be focused in many different directions or varied in intensity under control of a user's hand. A light sensor detects the focused light beam or an intensity of scattered light and generates a sensor signal based on either the light beam's area of coverage on the light sensor or the light beam's intensity. A modulating means receives the sensor signal and in response modulates a computer variable and/or an electronic signal. Thus a user, by manipulating the relationship between the light source and the light sensor can control computer variables and electronic signals.

In one application of the invention, the optical apparatus can be used to control a robotic device in three dimensional space. In another application of the invention, the optical apparatus can be used to control a objects in a virtual reality environment. And, in yet application of the invention, the optical apparatus can be used to control an X-cursor-position, a Y-cursor-position, and a Z-cursor-position on a three dimensional image displayed on a computer screen.

In another aspect of the invention, a freeze circuit enabables the variable modulation to be inhibited when the sensor signal either exceeds or falls below a predetermined maximum or minimum level. This freeze function thus enables a user to reposition the light source without further modulating the variable.

Within the method of the present invention, a light beam is generated which can be focused or scattered in many different directions. Next, a sensor signal is generated which varies with respect to either an area of a light sensor covered by the light beam or with respect to varying intensities of the light beam. Lastly, a pre-chosen variable, such as a computer data value or an electrical parameter, is modulated with the sensor signal. The modulation can be of the form of modulating a magnitude of the variable based on a rate of change in a magnitude of the sensor signal; modulating a magnitude of the variable based on a change in a magnitude of the sensor signal; or, modulating a rate of change of the variable based on the change in a magnitude of the sensor signal. The method also inhibits modulation of the variable when changes in the sensor signal are greater or less than a predetermined maximum or minimum change respectively.

The apparatus and method of the present invention is particularly advantageous over the prior art because the use of a moveable source of light eliminates the need to drag a mechanical tracking device or scratch a surface of an electro-static pad repetitiously, and thus minimizes hand injuries. The present invention also does not require parts the are subject to wear and tear, except for a flexible shell or a strap that can be used to enable a user to manipulate the light source. Also, the present invention easily translates a user's hand three dimensional hand motion into a set of three dimensional control signals, such as for moving a cursor, or controlling a robot. The present invention in fact can be used to control any number of dimensions of motion, simply by adding additional light sources and light sensors to the apparatus and controlling each light source with a different finger of the user's hand.

These and other aspects of the invention will be recognized by those skilled in the art upon review of the detailed description, drawings, and claims set forth below.

DETAILED DESCRIPTION OF THE PREFERRED EMBODIMENT

Figure 1:
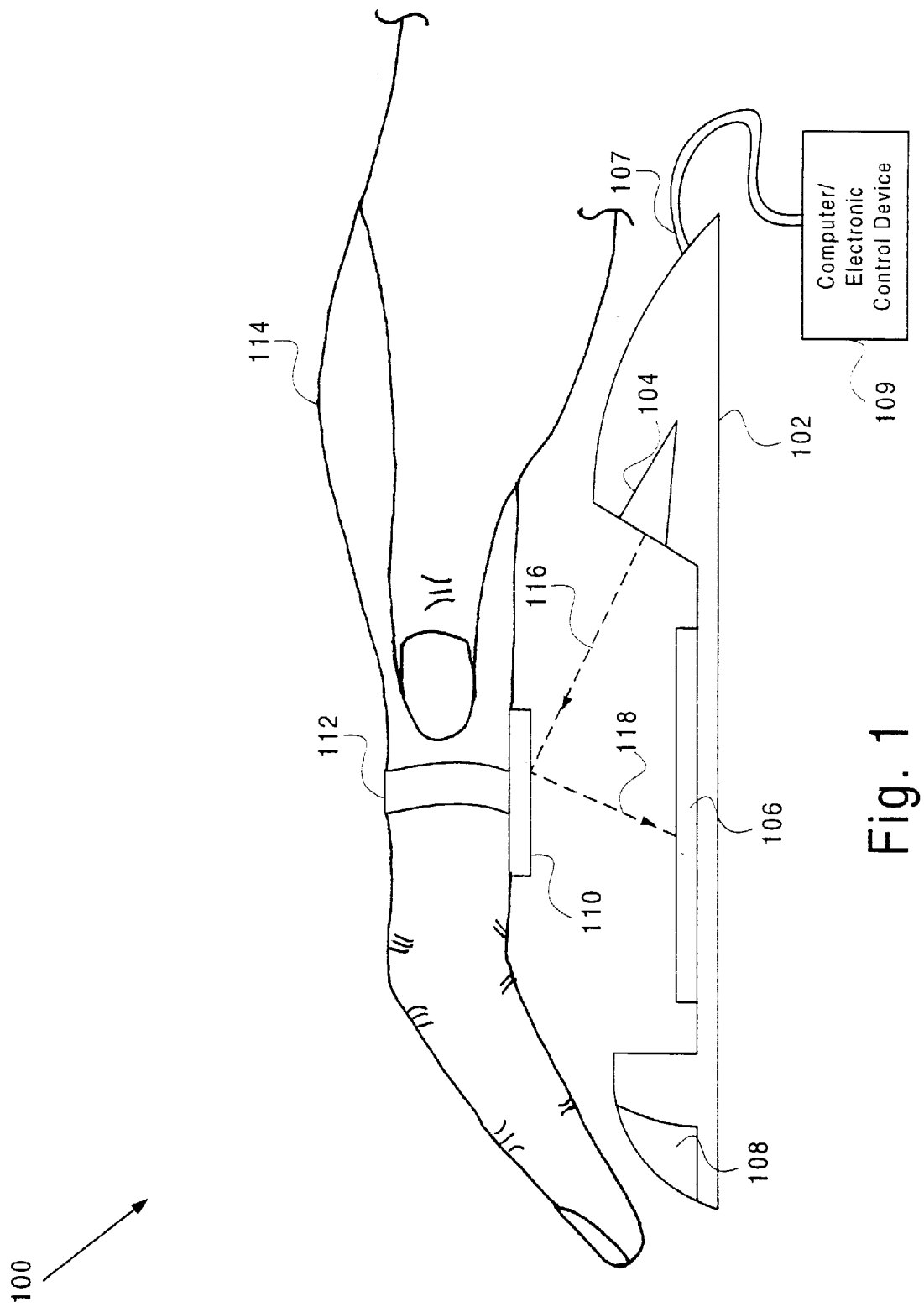
FIG. 1 is a cross-sectional view of an exemplary three dimensional (3D) tracking device.

FIG. 1 is a cross-sectional view of an exemplary three, dimensional (3D) tracking device 100. The tracking device 100 includes a housing 102. The housing 102 includes a light source 104, a light sensor 106, and a plurality of buttons 108. An electrical interface 107 couples the housing 102 to a computer/electronic control device 109. Hereinafter, only the term computer 109 will be used to refer to either the computer or the electronic control device. The tracking device 100 also includes a mirror 110 and a strap 112. The mirror 110 is coupled to a user's hand 114 via the strap 112.

The housing 102 is coupled to the light source 104, the light sensor 106, and the buttons 108. Power is supplied to the light source 104, the sensor 106 and the buttons 108 via the electrical interface 107. The electrical interface 107 also carries electrical signals from the sensor 106 and the buttons 108 back to the computer 109. The housing 102 may also include a power on/off switch (not shown).

The light source 104 transmits monochromatic light 116 and need not be very large or powerful. Alternatively, the light source 104 could generate light at any frequency in the visible or infrared spectrum. The transmitted light 116 reflects off the mirror 110 as reflected light 118 and illuminates the sensor 106. The location of the light source 104 within the housing 102 is such that the mirror 110 may be positioned by a user so that the reflected light 118 illuminates various regions on the light sensor 106.

The mirror 110 is somewhat small reflective surface for reflecting the light 116 from the light source 104 to the sensor 106. The mirror 110 is coupled to the palm of the 114 by the strap 112 so as not to move with the movement of the fingers. The strap 112 is adjustable to fit various size hands 114. The mirror 110 moves and tilts with the palm.

In a first alternate embodiment, the mirror 110 can be replaced with a set of reflective surfaces, each coupled to one finger on the hand 114 and independently moveable by each finger. The set of reflective surfaces can be combined with a set light sources such that each reflective surface reflects light from one of the light sources so as to provide a potential for more than 3 degrees of freedom. The following discussion however, is limited to a 3D tracking device having only one reflective surface.

In a second alternate embodiment, the mirror 110 can be replaced with a diffuser which constantly scatters light from the light source 104 on to the light sensor 106. Such a diffuser would often cover the light sensor 106 with at least a minimum amount of reflected light at all times. Analog electrical signals generated by the sensor 106 could then be modulated by varying the intensity of the reflected light on the sensor's 106 surface.

The light sensor 106 includes three photo-electric sensors and translates reflected light 118 from the mirror 110 into analog electrical signals sent over the electrical interface 107 to the computer 109. The magnitude of the analog electrical signal from each sensor varies in direct proportion to the amount of reflected light 118 hitting that sensor. These analog electrical signals are used by software in the computer 109 to change a location of a cursor in 3D space. Those skilled in the art will recognize that, instead of the location of a cursor being changed, any computer data value, display parameter, or electronic signal may be modulated by the electrical signals generated by the sensor 106.

The buttons 108 are used to provide a number of states that can be used to control events in the computer 109.

Figure 2:
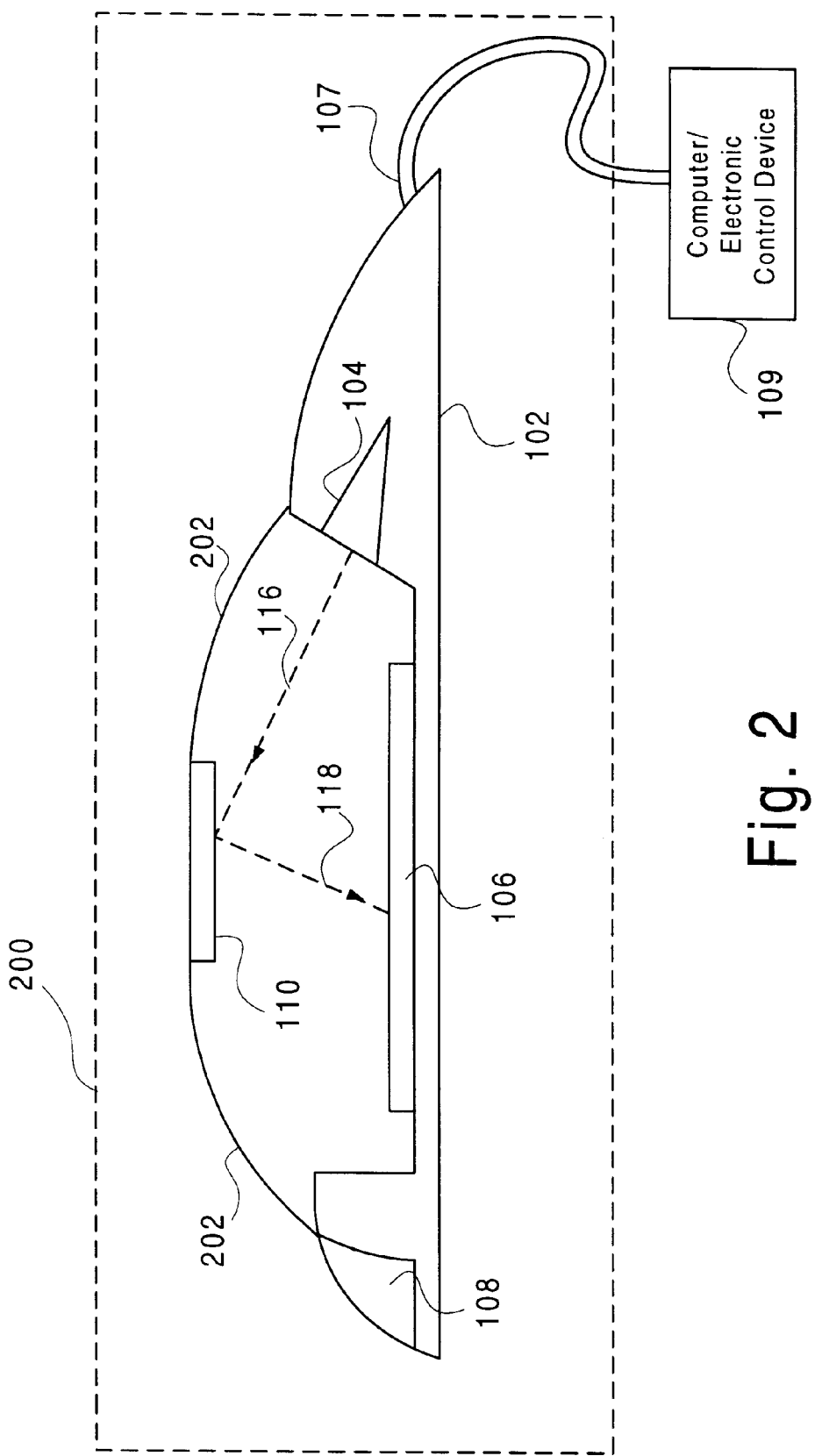
FIG. 2 is a cross-sectional view of a preferred 3D tracking device.

FIG. 2 is a cross-sectional view of a preferred 3D tracking device 200. The preferred 3D tracking device 200 varies from the exemplary 3D tracking device 100 only in that the strap 112 is replaced by a shell 202. The shell 202 is a semi-ridged device coupled to the mirror 110 and the housing 102. A user may press upon the outer surface of the shell 202 to move the mirror 110 in three dimensions (i.e. up/down, left/right, and forward/back). The shell 202 may fully enclose the light source 104 and sensor 106, but need not do so. Also in another exemplary embodiment (not shown) the light source 104, instead of being coupled to the housing 102, could be coupled to the shell 202 so that the light sensor 106 would receive direct light.

Figure 3:
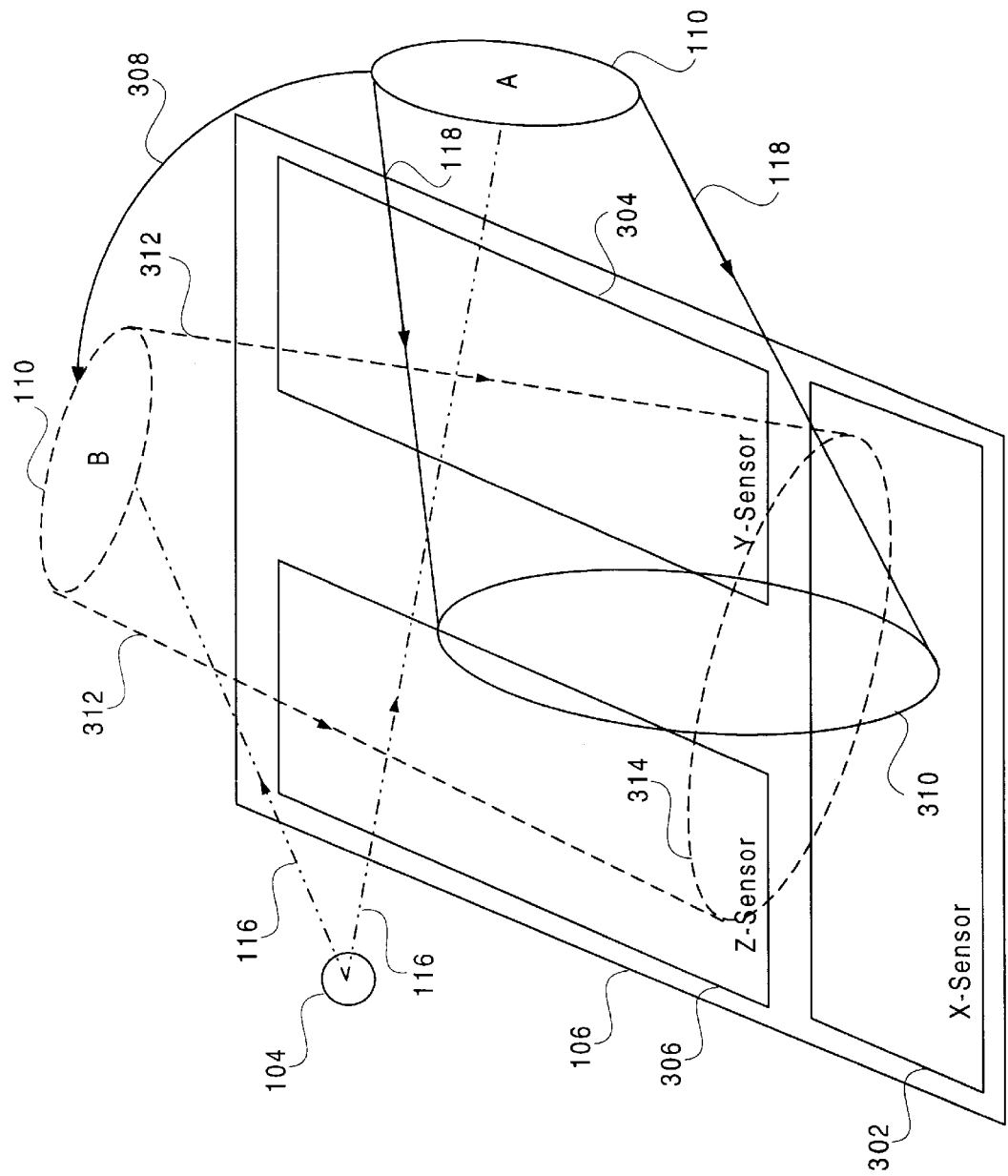
FIG. 3 is a perspective representation of a light-source, mirror, and sensor interface within the 3D tracking device.

FIG. 3 is a perspective representation of the light-source 104, mirror 110, and sensor 106 interface within the 3D tracking device 100. The sensor 106 includes an X-sensor 302, a y-sensor 304, and a z-sensor 306. The mirror 110 is shown in a first position "A" which translates, as shown by line 308, to a second position "B." Movement of the mirror 110 increases and/or decreases an area of the sensors 302, 304, 306 covered by reflected light, resulting in changes in the magnitude of the electrical signal on the electrical interface 107 For instance, when the mirror 110 is in position "A," the light 116 transmitted by the light source 104 becomes reflected light 118 that covers a first spot 310 on the sensor 106. When the mirror 110 is in position "B," the light 116 transmitted by the light source 104 becomes reflected light 312 that covers a second spot 314 on the sensor 106. Since the spots 310, 314 cover different portions of the sensors 302, 304, 306 as the location of the mirror 110 changes, the electrical signal transmitted by each sensor 302, 304, 306 over the electrical interface 107 also changes. Each sensor 302, 304, 306 generates its own electrical signal which is monitored and stored by the computer 109. The computer 109 may then move a cursor: first, in response to a mere presence of reflected light 118, 312 on one of the sensors 302, 304, 306; second, in relation to a total area of the sensor 302, 304, 306 covered by reflected light 118, 312; third in relation to a rate of change of the total area of the sensor 302, 304, 306 covered by reflected light 118, 312; fourth, in relation to a light intensity on the sensor 302, 304, 306; and fifth, in relation to a rate of change in the light intensity on the sensor 302, 304, 306.

Figure 4:
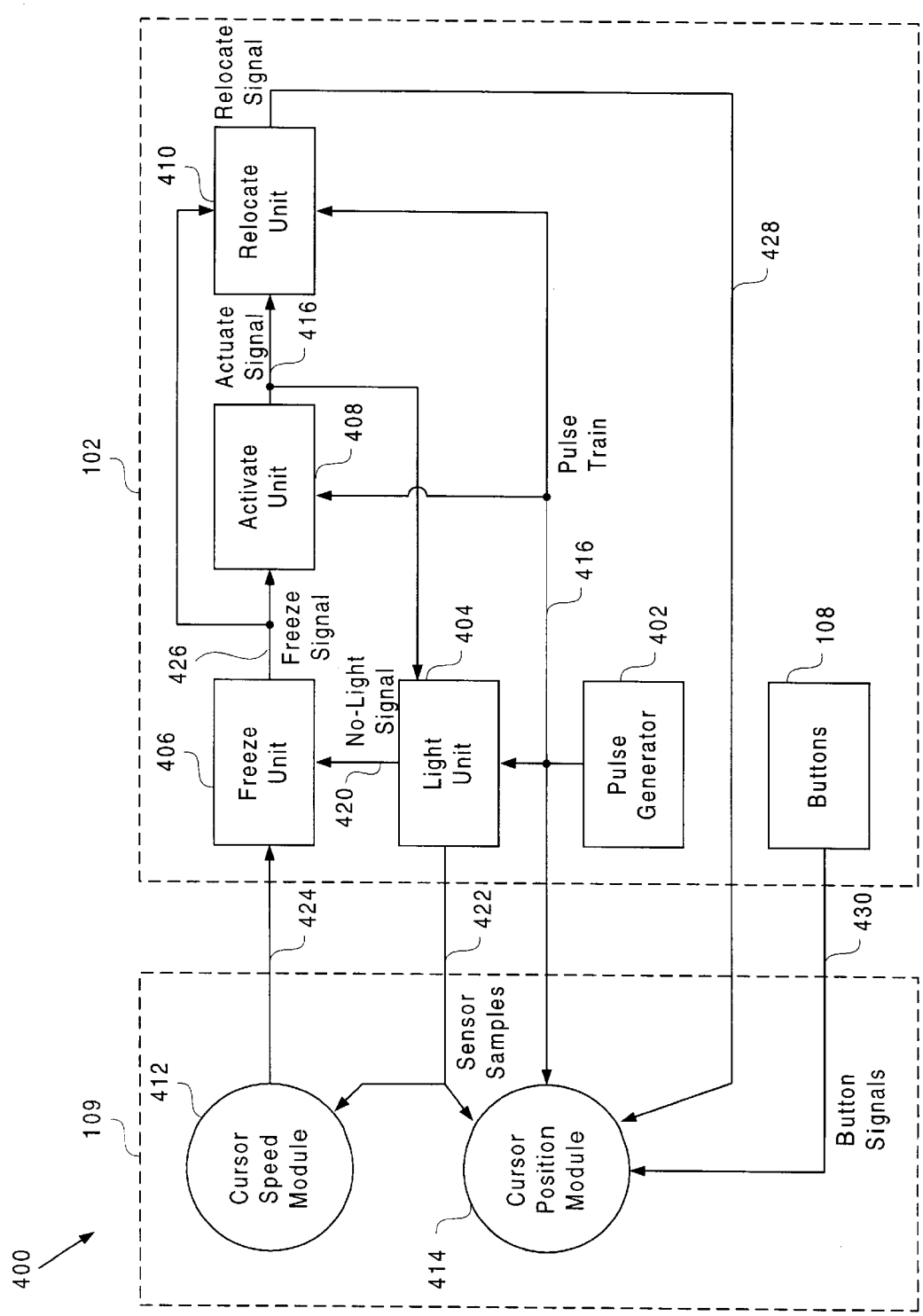
FIG. 4 is a data-flow diagram of a profile-mode of 3D tracking device operation.

FIG. 4 is a data-flow diagram 400 of a profile-mode of 3D tracking device 100 operation. In addition to the elements shown in FIG. 1, the housing 102 includes a pulse generator 402, a light unit 404, a freeze unit 406, an activate unit 408, a relocate unit 410, and the buttons 108. The computer 109 includes a cursor speed module 412 and a cursor position module 414. An internal memory (not shown) within the computer 109 stores computer-readable program instructions for controlling how the computer accesses, transforms and outputs data, as is discussed in detail below. The internal memory includes both a volatile and a non-volatile portion. Those skilled in the art will recognize that the internal memory could be supplemented with other computer useable storage media, including a compact disk, a magnetic drive or a dynamic random access memory.

The pulse generator 402 is used for producing a pulse train on line 416 whenever the 3D tracking device 100 is powered on.

The light unit 404 in the profile-mode is coupled via line 418 to receive an activate signal from the activate unit 408, and the pulse train via line 416 from the pulse generator 402. The light unit 404 sets a no-light signal on line 420 to false when reflected light 118 falls on any of the three sensors 302, 304, 306, and sets the no-light signal to true otherwise. Typically, the no-light signal will be true only when power is first turned on or when the reflected spot 310, 314 moves out of range of the sensors 302, 304, 306. If the activate signal is set to true, the light unit 404 uses the pulse train to sample the electrical signals generated by the sensors 302, 304, 306 to create a three part sensor signal on line 422, containing an x-sensor sample, a y-sensor sample, and a z-sensor sample.

Those skilled in the art will recognize that the "true" and "false" signal states in this discussion can, in one exemplary embodiment, be equivalent to Boolean logic "1" and "0" states, and can, in a second exemplary embodiment, be equivalent to different analog voltage or current levels.

The cursor speed module 412 is a software program coupled to receive the sensor samples from the light unit 404. The cursor speed module 412 calculates a speed with which each of the sensor samples are changing. The cursor speed module 412 generates a below-minimum-change-rate signal or. line 424 if the cursor speed is less than a first predetermined value. Typically, the below-minimum-change-rate signal is generated when the reflected spot 310, 314 is standing steady or moving very little on the light sensor 106 (i.e. such as when a user is trying to position the cursor at a specific point on a display). The cursor speed module 412 generates an above-maximum-change-rate signal on line 424 if the cursor speed is greater than a second predetermined value. Typically, the above-maximum-change-rate signal is generated when a user has finished displacing the cursor by moving the reflected spot 310, 314 over the sensors and now intends that the cursor remain in its currently displayed position while the reflected spot is moved to a new location.

The freeze unit 406 is coupled to receive the no-light signal on line 420 from the light sensor 106, and to receive the below-minimum-change-rate signal and the above-maximum-change-rate signal on line 424 from the cursor speed module 412. If either the no-light signal, the below-minimum-change-rate signal, or the above-maximum-change-rate signal is set to true the freeze unit 406 sets a freeze signal on line 426 to true, otherwise the freeze signal is set to false. Setting the freeze signal to true has the effect of telling the computer 109 to freeze the cursor in its current position. The freeze unit 406 also sends the freeze signal via line 426 to the relocate unit 410

The activate unit 408 is coupled to receive the freeze signal from the freeze unit 406, and the pulse train from the pulse generator 402. The activate unit 408 generates an activate signal on line 418. When the freeze signal is set to true, the activate unit 408 sets the activate signal to false. When the freeze signal transitions from true to false, the activate unit 408 uses the pulse train to generate a predetermined delay before the activate unit 408 sets the activate signal to true. The activate delay ensures that any unintentional or intermittent true values of the freeze signal do not affect the relocate unit 410 (i.e. the relocate unit 410 uses the activate signal to ignore unintentional flickers of the freeze signal). Note, while the delay is described as digitally generated, those skilled in the art will recognize that the delay may also be generated by analog means, such as a discharging capacitor.

The relocate unit 410 is coupled to receive the activate signal from the activate unit 408, the pulse train from the pulse generator 402, and the freeze signal from the freeze unit 406. The relocate unit 410 generates a relocate signal on line 428 which is sent to the cursor position module 414. The relocate unit 410 sets the relocate signal to true when the activate signal and the freeze signal are true and a pulse has been received from the pulse train. The relocate unit 410 sets the relocate signal to false after a predetermined delay from when the relocate signal is set to true. This delay gives the user time to move the mirror 110 to a new position with respect to the light sensor 106, while the cursor is kept frozen on the computer display.

The buttons 108 generate button signals on line 430 that can serve a variety of application specific purposes, one of which is to selectively control movement of the cursor. In one application, the buttons 108 could be used to select points in two or three dimensional space and specify a path or surface, so that the motion of the cursor could be constrained to the selected path or surface. The buttons 108 have at least three states: inactive, active, and active-hold.

Figure 9:
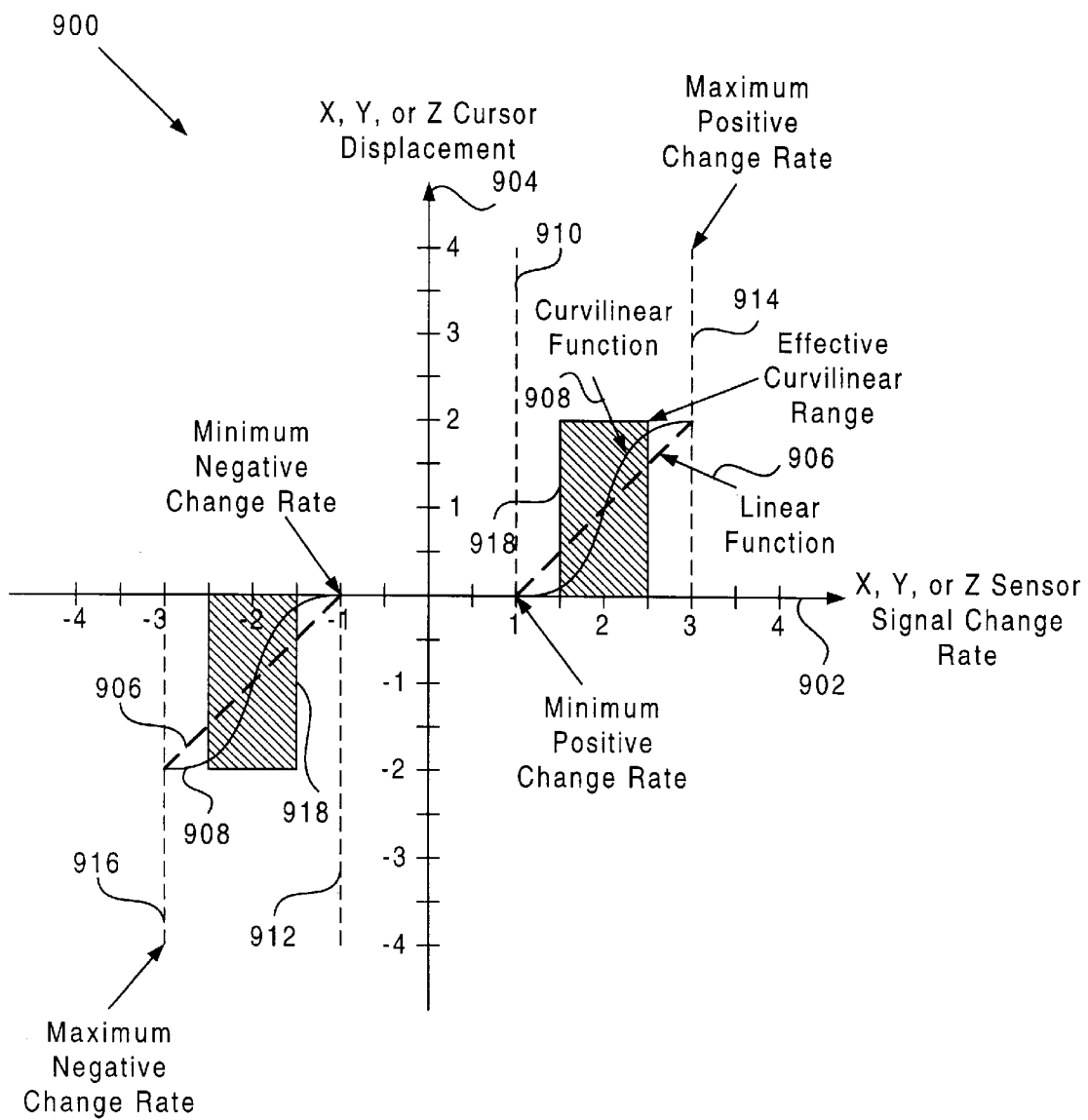
FIG. 9 is a graphical representation of cursor displacement in the profile-mode.

The cursor position module 414, in the profile-mode, is coupled to receive the sensor samples from the light unit 404, the pulse train from the pulse generator 402, the relocate signal from the relocate unit 410, and the button signals from the buttons 108. The cursor position module 414 uses the pulse train, the sensor samples, and the button signals to control the cursor's position on a display device (not shown). When the reposition signal is set to false, the cursor position module 414 retrieves a last cursor location from memory, calculates a new cursor location based on a rate at which the sensor samples are changing, and moves the cursor from the last cursor location to the new cursor location. A graph of this relationship is shown in FIG. 9. When the relocate signal is set to true, the cursor position module 414 freezes the cursor at the new cursor location, and stores the new cursor location as the last cursor location in the memory. The buttons 108 are used to tell the cursor position module 414 which mode to operate in. As previously introduced, the profile-mode is one of the modes; however, additional modes can be specified, two of which are discussed below.

Figure 5:
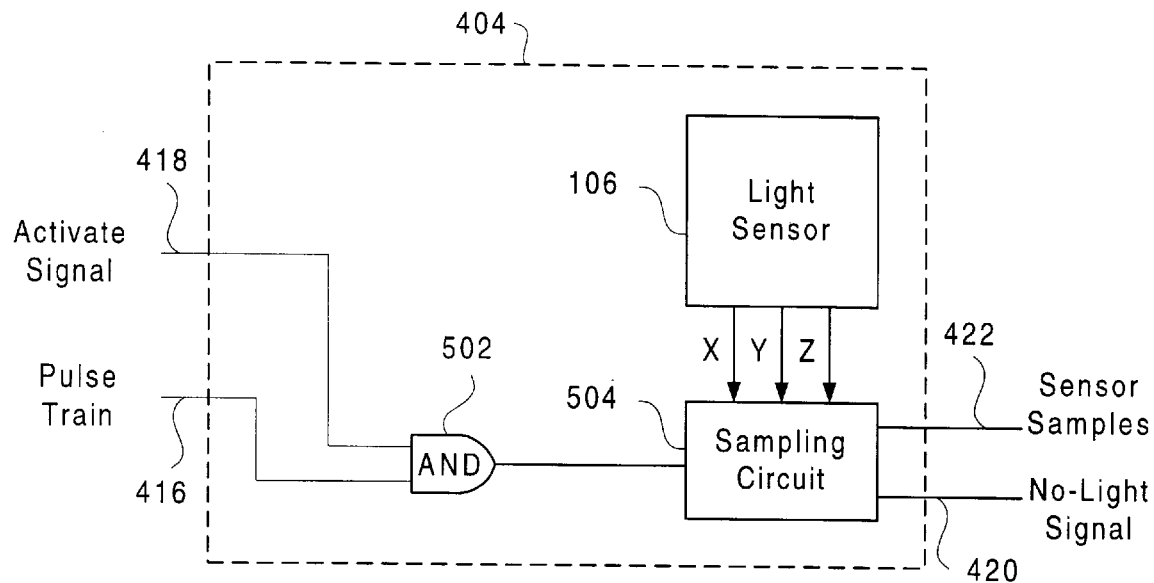
FIG. 5 is a functional block diagram of a light unit.

FIG. 5 is a functional block diagram of the light unit 404. The light unit 404 includes an AND gate 502, a sampling circuit 504, and the light sensor 106. The AND gate 502 is coupled to receive the activate signal and the pulse train. When the activate signal is set to true, the pulse train is passed on to the sampling circuit 504. The sampling circuit 504 is coupled to receive the electrical signals from the light sensor 106 and uses the pulse train to sample those signals so as to generate the sensor samples on line 422. The sampling circuit 504 also sets the no-light signal on line 420 to true if the electrical signals from the light sensor 106 are at or below a predetermined nominal value.

Figure 6:
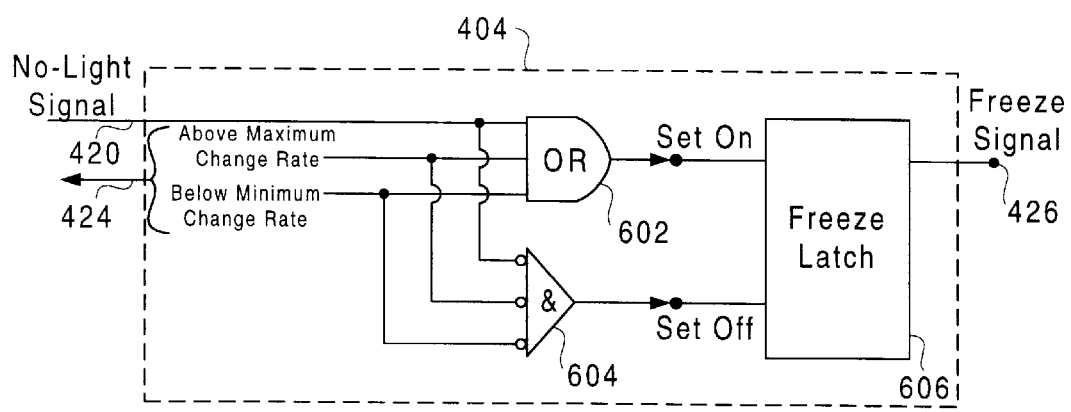
FIG. 6 is a functional block diagram of a freeze unit in the profile-mode.

FIG. 6 is a functional block diagram of a freeze unit 406 in the profile-mode. The freeze unit 406 includes an OR gate 602, an AND gate 604, and a freeze latch 606. The OR gate 602 and the AND gate 604 are coupled to receive the no-light signal, the below-minimum-change-rate signal, and the above-maximum-change-rate signal. The OR gate 602 outputs a true signal if either the no-light signal, the below-minimum-change-rate signal, or the above-maximum-change-rate signal is set to true. A true signal from the OR gate 602 sets the freeze latch 606, which in turn sets the freeze signal on line 426 to true. The AND gate 604 outputs a true signal if the no-light signal, the below-minimum-change-rate signal, or the above-maximum-change-rate signal are all set to false. A true signal from the AND gate 604 resets the freeze latch 606, which in turn sets the freeze signal on line 426 to false.

Figure 7:
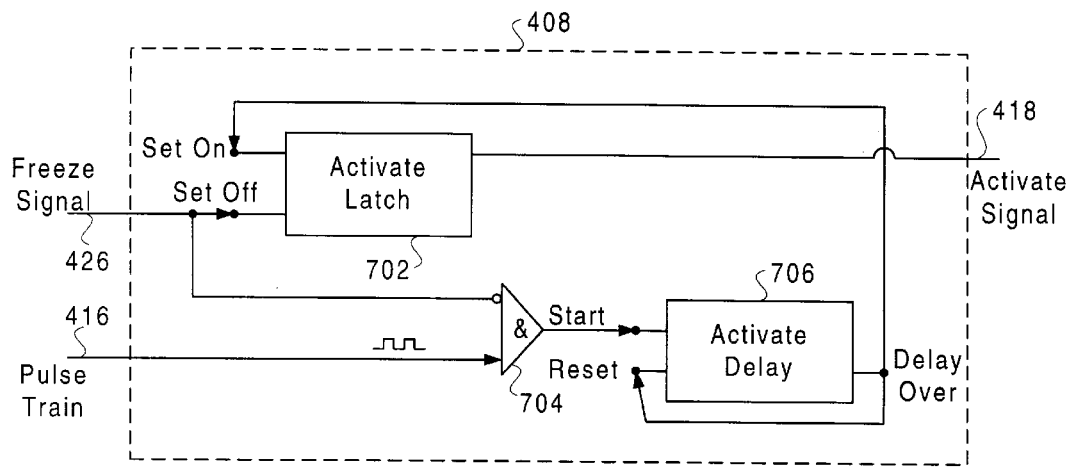
FIG. 7 is a functional block diagram of an activate unit.

FIG. 7 is a functional block diagram of the activate unit 408. The activate unit 408 includes an activate latch 702, an AND gate 704, and an activate delay 706. The activate latch 702 and the AND gate 704 are coupled to receive the freeze signal. When the freeze signal is true, the activate latch 702 is turned off and the AND gate 704 does not pass the pulse train to the activate delay 706. When the activate latch 702 is turned off, the activate signal on line 418 is set to false. When the activate delay 706 does not receive the pulse train from the AND gate 704, the activate delay 706 sets a delay-over signal to false. The activate latch 702 and the activate delay 706 are coupled to receive the delay-over signal. When the delay-over signal is set to false, the activate latch 702 and the activate delay 706 remain in their current state.

When the freeze signal is false, the activate latch 702 remains in its current state, but the AND gate 704 passes the pulse train to the activate delay 706. Upon receiving the pulse train, the activate delay 706 begins to count a predetermined number of pulse train pulses afterwhich the activate delay 706 sets the delay-over signal to true. When the delay-over signal is set to true, the activate latch 702 turns on and sets the activate signal on line 418 to true, and the activate delay 706 resets its internal pulse counter to zero.

Figure 8:
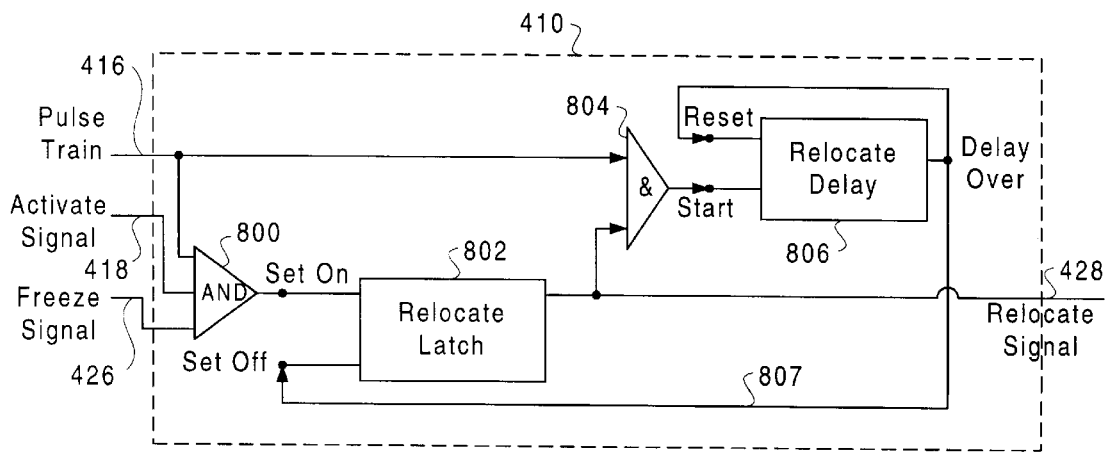
FIG. 8 is a functional block diagram of a reposition unit.

FIG. 8 is a functional block diagram of the relocate unit 410. The relocate unit 410 includes a first AND gate 800, a relocate latch 802, a second AND gate 804, and a relocate delay 806. The first AND gate 800 is coupled to receive the pulse train on line 416, the activate signal on line 418, and the freeze signal on line 426. The first AND gate 800 generates a true signal when all three of the first AND gate's 800 inputs are true. The relocate latch 802 is coupled to receive the first AND gate's 800 output signal and a delay-over signal on line 807 from the relocate delay 806. When the first AND gate's 800 output signal is true, the relocate latch 802 is turned on. When the relocate latch 802 is turned on, the relocate signal on line 428 is set to true.

When the first AND gate's 800 output signal transitions to false (i.e. when either the pulse train, the activate signal, or the freeze signal transitions to false), the relocate latch 802 remains in its current state (i.e. the relocate signal is still set to true). When the relocate signal is true, the second AND gate 804 passes the pulse train to the relocate delay 806. Upon receiving the pulse train, the relocate delay 806 counts a predetermined number of pulse train pulses afterwhich the relocate delay 806 sets the delay-over signal on line 807 to true. When the delay-over signal is set to true, the relocate latch 802 turns off, setting the relocate signal on line 428 to false. The true delay-over signal also resets the internal pulse counter of the relocate delay 806 to zero.

FIG. 9 is a graphical representation 900 of cursor displacement in the profile-mode. An X, Y, or Z sensor output change rate 902 is shown graphed against an X, Y, or Z cursor displacement 904. The change rate 902 is calculated by the cursor position module 414 by comparing the sensor samples received from the light unit 404, as discussed with reference to FIG. 4. The relationship between the change rate 902 and the displacement 904 can follows any linear 906 or curvilinear 908 function. There is no displacement 904 for any change rate 902 less than the minimum positive change rate 910 and greater than the minimum negative change rate 912. There is also no displacement 904 for any change rate 902 greater than the maximum positive change rate 914 and less than the maximum negative change rate 916.

Cursor displacement 904 is permitted between the minimum positive change rate 910 and the maximum positive change rate 914, and between the minimum negative change rate 912 and the maximum negative change rate 916, as shown by either the linear 906 or curvilinear 908 functions. Use of the curvilinear function 908 increases the displacement 904 for a given increase in the change rate 902 within the effective curvilinear range 918 and thus allows a user to customize how much the cursor position module 414 displaces the cursor for a given variation in the received sensor samples. This displacement customization is called vernier control and may be set to a fine, medium, or coarse setting.

Figure 10:
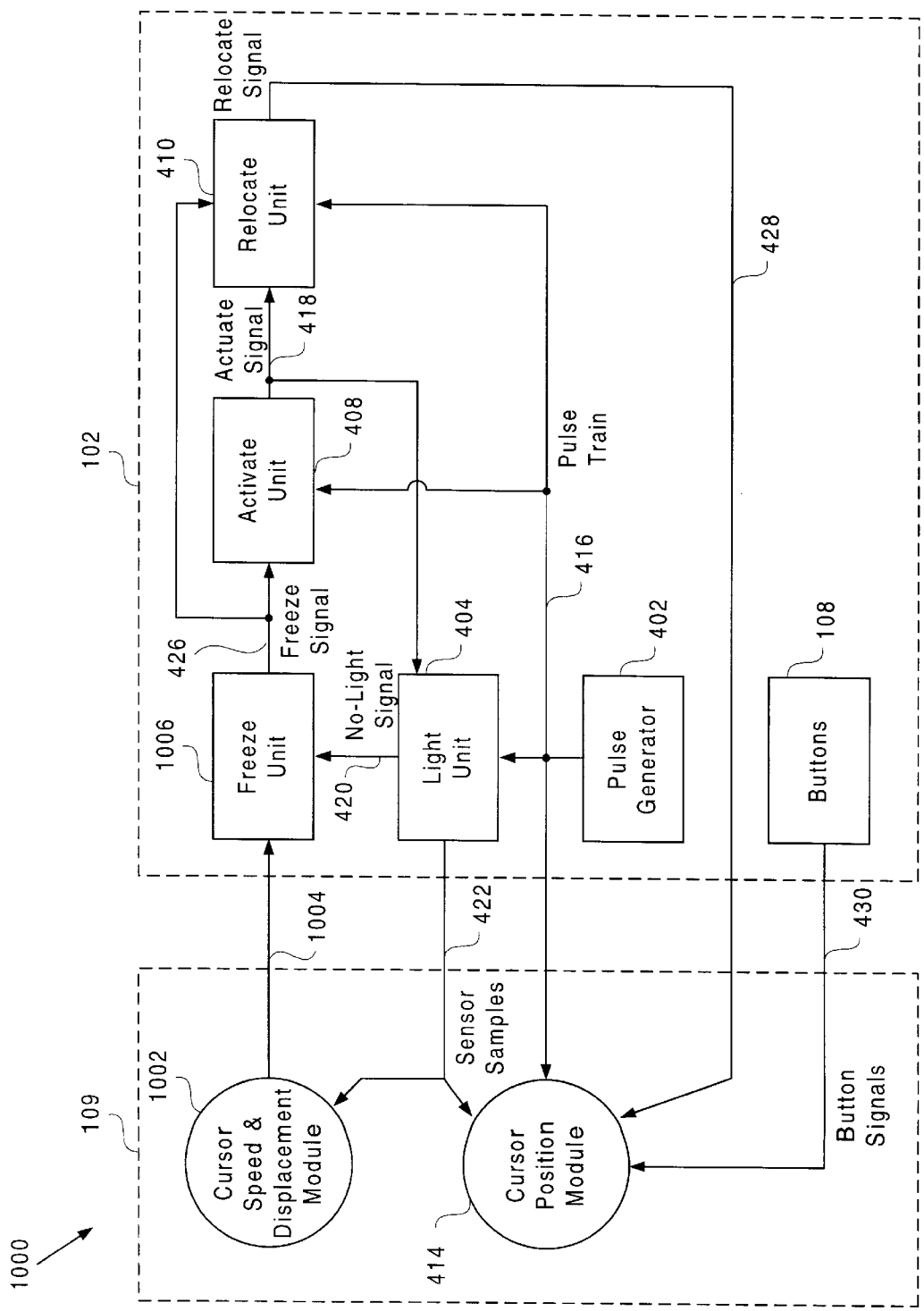
FIG. 10 is a data-flow diagram of a direct-mode and an additive-mode of 3D tracking device operation.

FIG. 10 is a data-flow diagram 1000 of a direct-mode and an additive-mode of 3D tracking device 100 operation. While in the direct-mode and the additive-mode, the 3D tracking device 100 operates in the same manner as in the profile-mode (see FIG. 4) with the following exceptions.

First, a user can transition the 3D tracking device 100 from the profile-mode to either the direct-mode or the additive-mode by pressing one or more of the buttons 108.

Second, the cursor speed module 412 in the profile-mode (see FIG. 4) is replaced by a cursor speed-and-displacement module 1002. The cursor speed-and-displacement module 1002 is a software program coupled to receive the sensor samples from the light unit 404. The cursor speed-and-displacement module 1002 calculates a speed with which each of the sensor samples are changing and generates an above-maximum-change-rate signal on line 1004 if the cursor speed is greater than a second predetermined value. Typically, the above-maximum-change-rate signal is generated when a user has finished displacing the cursor by moving the reflected spot 310, 314 over the sensors and now intends that the cursor remain in its currently displayed position while the reflected spot is moved to a new location. The cursor speed-and-displacement module 1002 also calculates a cursor change value, representing a difference between a current location of the cursor and a distance to move the cursor based on the electrical signals received from the sensors 302, 304, 306. The cursor speed-and-displacement module 1002 generates a below-minimum-change signal on line 424 if the cursor change is less than a first predetermined value. Typically, the below-minimum-change signal is generated when the reflected spot 310, 314 is standing steady or moving very little on the light sensor 106 (i.e. such as when a user is trying to position the cursor at a specific point on a display). The cursor speed module 412 generates an above-maximum-change signal on line 424 if the cursor change is greater than a second predetermined value. Typically, the above-maximum-change signal is generated when a user has moved the reflected spot 310, 314 so that it would exceed the cursor's maximum possible value within an application program.

Third, the freeze unit 406 in the profile-mode (see FIG. 4) is replaced by a new freeze unit 1006. The new freeze unit 1006 is coupled to receive the no-light signal on line 420 from the light sensor 106, the above-maximum-change-rate signal, the below-minimum-change signal, and the above-maximum-change signal on line 1004 from the cursor speed-and-displacement module 1002. If either the no-light signal, the above-maximum-change-rate signal, the below-minimum-change signal, or the above-maximum-change signal is set to true the freeze unit 1006 sets a freeze signal on line 426 to true, otherwise the freeze signal is set to false. Setting the freeze signal to true has the effect of telling the computer 109 to freeze the cursor in its current position. The freeze unit 1006 also sends the freeze signal via line 426 to the relocate unit 410

Figure 12:
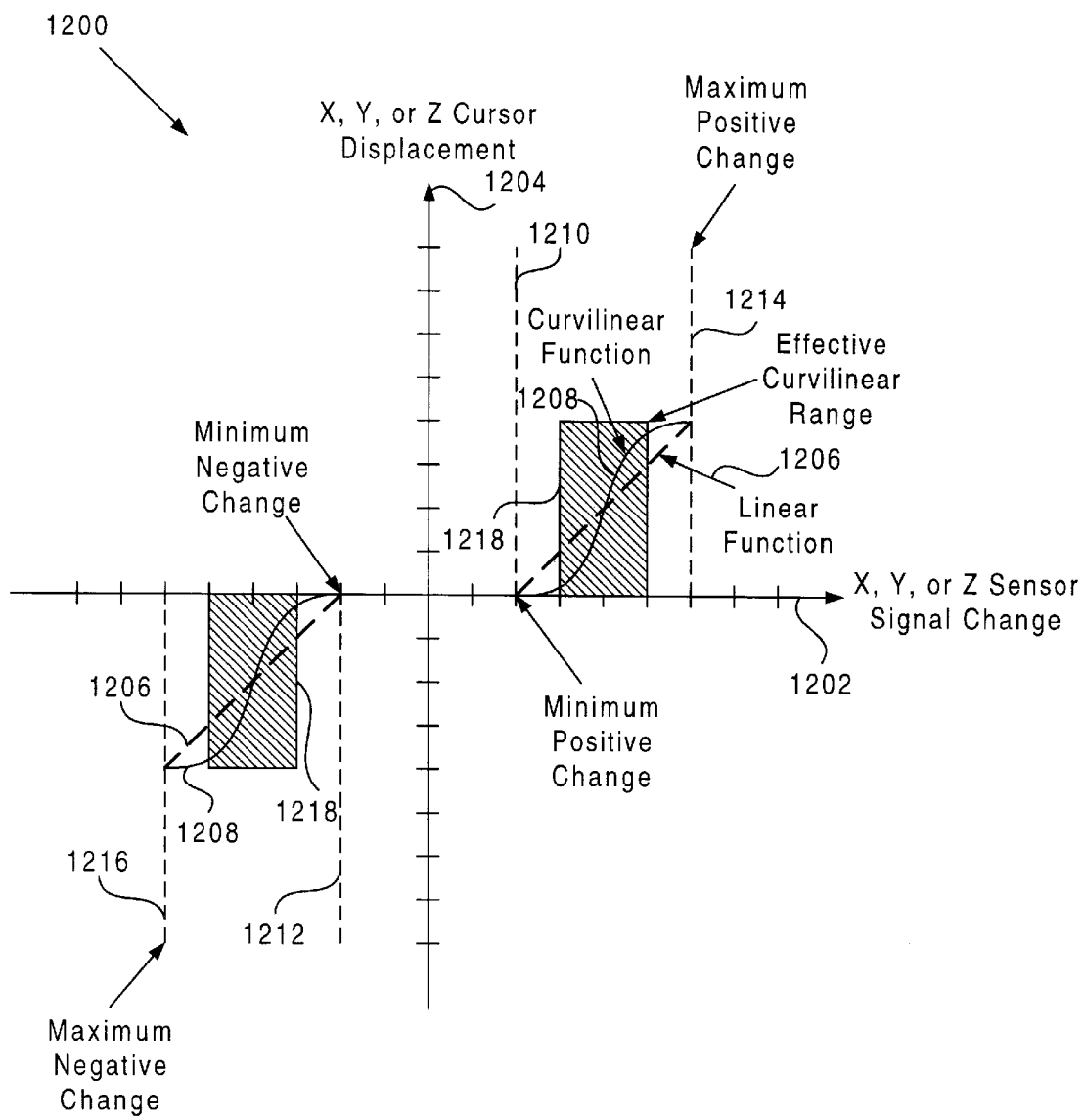
FIG. 12 is a graphical representation of cursor displacement in the direct-mode.

Fourth, while in the direct-mode, the cursor position module 414 operates as follows. When the reposition signal is set to false, the cursor position module 414 retrieves a last cursor location from memory, calculates a new cursor location based on the absolute value of the sensor samples and based on a direction signal from the buttons 108, and then moves the cursor from the last cursor location to the new cursor location. The overall effect of the direct-mode is to move the cursor proportionally to the movement of the reflected spot on the sensors. A graph of this relationship is shown in FIG. 12. When the relocate signal is set to true, the cursor position module 414 freezes the cursor at the new cursor location, and stores the new cursor location as the last cursor location in the memory.

Figure 13:
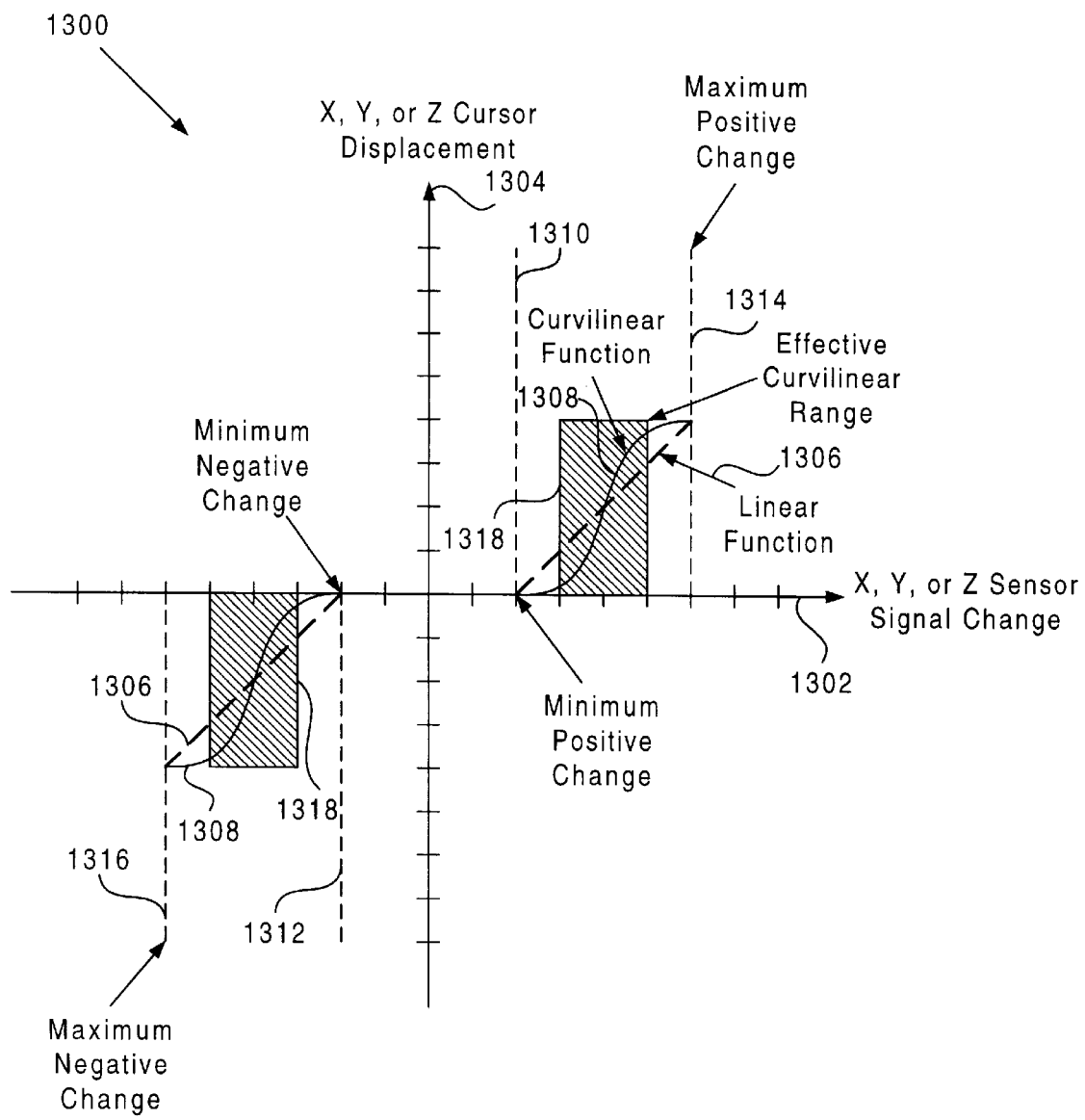
FIG. 13 is a graphical representation of cursor displacement in the additive-mode.

Lastly, while in the additive-mode, the cursor position module 414 operates as follows. When the reposition signal is set to false, the cursor position module 414 retrieves a last cursor displacement rate from memory, calculates a new cursor displacement rate based on the absolute value of the sensor samples and based on a direction signal from the buttons 108, and then moves the cursor from a last cursor location to a new cursor location at the new cursor displacement rate. The overall effect of the additive-mode is to pan the cursor at a rate corresponding to the location of the reflected spot on the sensors. A graph of this relationship is shown in FIG. 13. When the relocate signal is set to true, the cursor position module 414 freezes the cursor at the new cursor location, and stores the new cursor location as the last cursor location in the memory.

Figure 11:
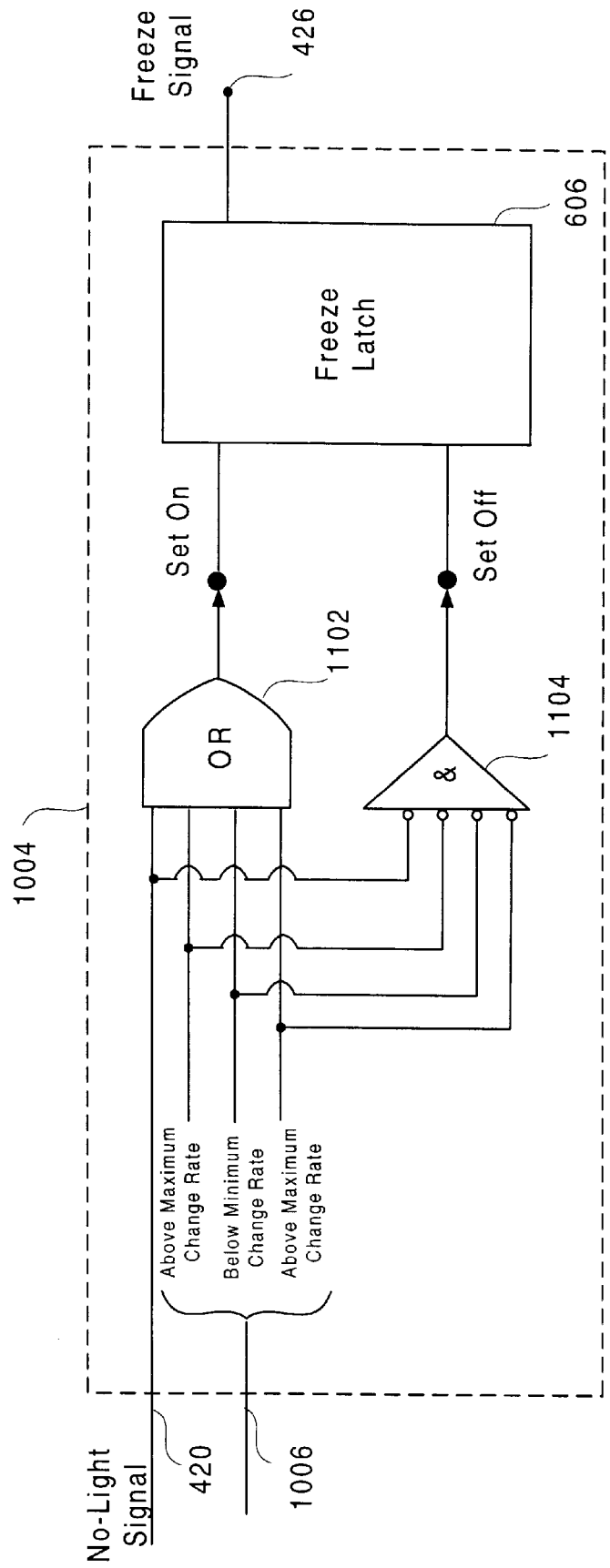
FIG. 11 is a functional block diagram of the freeze unit in the direct-mode and in the additive-mode.

FIG. 11 is a functional block diagram of the freeze unit 1006 in the direct-mode and in the additive-mode. The freeze unit 1006 includes an OR gate 1102, an AND gate 1104, and the freeze latch 606. The OR gate 1102 and the AND gate 1104 are coupled to receive the no-light signal, the above-maximum-change-rate signal, the below-minimum-change signal, and the above-maximum-change signal. The OR gate 1102 outputs a true signal if either the no-light signal, the above-maximum-change-rate signal, the below-minimum-change signal, or the above-maximum-change signal is set to true. A true signal from the OR gate 1102 sets the freeze latch 606, which in turn sets the freeze signal on line 426 to true. The AND gate 1104 outputs a true signal if the no-light signal, the above-maximum-change-rate signal, the below-minimum-change signal, and the above-maximum-change signal are all set to false. A true signal from the AND gate 1104 resets the freeze latch 606, which in turn sets the freeze signal on line 426 to false.

FIG. 12 is a graphical representation 1200 of cursor displacement in the direct-mode. An X, Y, or Z sensor signal change 1202 is shown graphed against an X, Y, or Z cursor displacement 1204. The change 1202 is calculated by the cursor position module 414 by comparing the sensor samples received from the light unit 404, as discussed with reference to FIG. 10. The relationship between the change 1202 and the displacement 1204 can follow any linear 1206 or curvilinear 1208 function. There is no displacement 1204 for any change 1202 less than the minimum positive change 1210 and greater than the minimum negative change 1212. There is also no displacement 1204 for any change 1202 greater than the maximum positive change 1214 and less than the maximum negative change 1216.

Cursor displacement 1204 is permitted between the minimum positive change 1210 and the maximum positive change 1214, and between the minimum negative change 1212 and the maximum negative change 1216, as shown by either the linear 1206 or curvilinear 1208 functions. Use of the curvilinear function 1208 increases the displacement 1204 for a given increase in the change 1202 within the effective curvilinear range 1218 and thus allows a user to customize how much the cursor position module 414 displaces the cursor for a given variation in the received sensor samples.

FIG. 13 is a graphical representation of cursor displacement in the additive-mode. An X, Y, or Z sensor signal change 1302 is shown graphed against an X, Y, or Z cursor displacement rate 1304. The change 1302 is calculated by the cursor position module 414 by comparing the sensor samples received from the light unit 404, as discussed with reference to FIG. 10. The relationship between the change 1302 and the displacement rate 1304 can follow any linear 1306 or curvilinear 1308 function. The displacement rate 1304 is set to zero for any change 1302 less than the minimum positive change 1310 and greater than the minimum negative change 1313. The displacement rate 1304 is also set to zero for any change 1302 greater than the maximum positive change 1314 and less than the maximum negative change 1316.

A non-zero cursor displacement rate 1304 is permitted between the minimum positive change 1310 and the maximum positive change 1314, and between the minimum negative change 1312 and the maximum negative change 1316, as shown by either the linear 1306 or curvilinear 1308 functions. Use of the curvilinear function 1308 increases the displacement rate 1304 for a given increase in the change 1302 within the effective curvilinear range 1318 and thus allows a user to customize how fast the cursor position module 414 displaces the cursor for a given variation in the received sensor samples.

Figure 14:
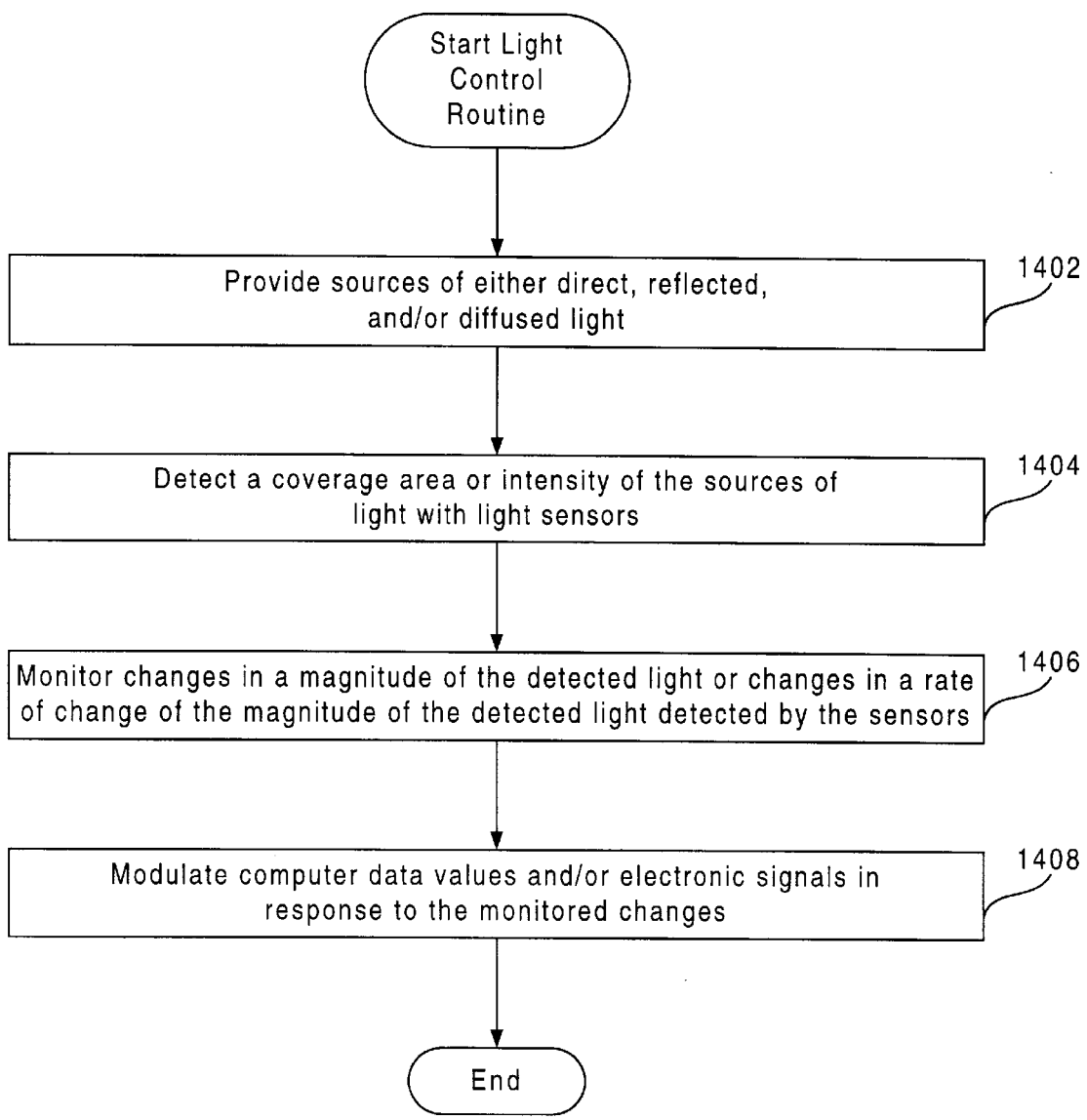
FIG. 14 is a flowchart for operating the 3D tracking device.

FIG. 14 is a flowchart for operating the 3D tracking device 100. The method begins in step 1402 where one or more light sources 104 provide either direct, reflected, and/or diffused light. Next in step 1404, one or more light sensors 106 detect an area of the light sensor 106 covered by the light or detect a light intensity covering a fairly constant area of the light sensor 106. The cursor position module 414 monitors changes in a magnitude of the detected light or changes in a rate of change of the magnitude of the detected light detected by the light sensor 106, in step 1406. Next, in step 1408, the cursor position module 414 modulates computer data values and/or electronic signals in response to the monitored changes. Step 1408 is described in detail in FIG. 15 below. After step 1408 the method for operating the 3D tracking device 100 ends.

Figure 15:
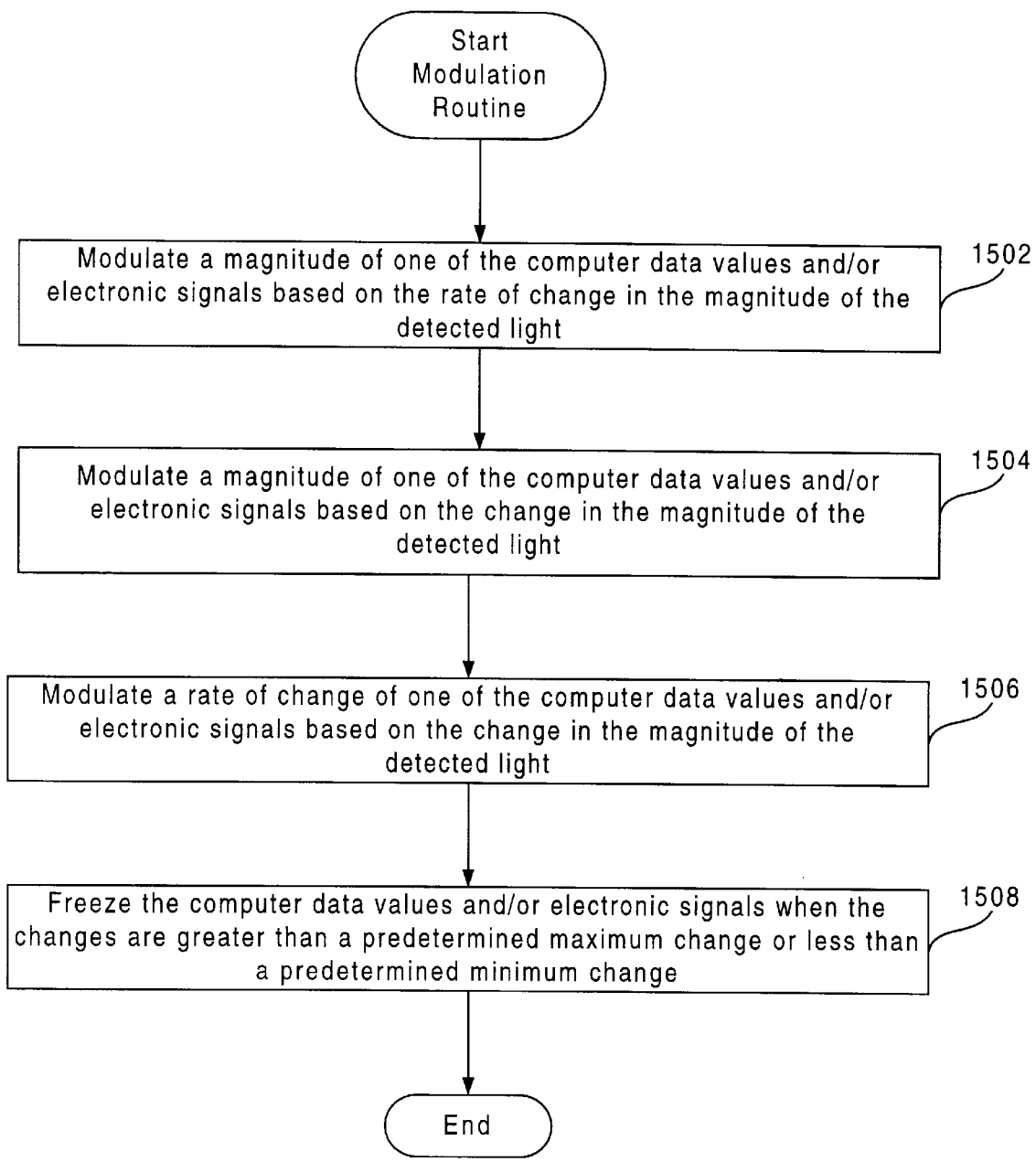
FIG. 15 is a flowchart for modulating electronic signals and computer data.

FIG. 15 is a flowchart for modulating computer data values and/or electronic signals (step 1408 of FIG. 14).

Steps 1502, 1504, and 1506 describe the three different modes of cursor position module 414 operation discussed with reference to FIGS. 9, 12, and 13. Step 1502 (i.e. the profile mode) configures the cursor position module 414 to modulate a magnitude of one of the computer data values and/or electronic signals based on the rate of change in the magnitude of the detected light. While step 1504 (i.e. the direct mode) configures the cursor position module 414 to modulate a magnitude of one of the computer data values and/or electronic signals based on the change in the magnitude of the detected light. And step 1506 (i.e. the additive mode) configures the cursor position module 414 to modulate a rate of change of one of the computer data values and/or electronic signals based on the change in the magnitude of the detected light. In step 1508, either the cursor speed module 412 or the cursor speed-and-displacement module 1002 freezes the computer data values and/or electronic signals when the changes are greater than a predetermined maximum change or less than a predetermined minimum change. After step 1508 the method for modulating computer data values and/or electronic signals ends.

Those skilled in the art will recognize that the 3D tracking device 100 may be used to manipulate images in 2D, Simulated 3D, Sliced 3D or "real" 3D modes. 2D refers to a conventional two dimensional image, such as a textual page. Simulated 3D refers to a two dimensional picture simulating a three dimensional image, such as a car standing or running over a road. Sliced 3D refers to a three dimensional object that is presented one slice at a time, such as seen in imaging technologies. Real 3D refers to a real three dimensional image, such as in virtual reality applications. The 3D tracking device 100 may also be used to control spin, speed, and direction in a games application, control the motion of the cursor through a definable path or surface in space, or control a mathematically defined function connecting points in a set of degrees of freedom.

While the present invention has been described with reference to a preferred embodiment, those skilled in the art will recognize that various modifications may be made. Variations upon and modification to the preferred embodiment are provided by the present invention, which is limited only by the following claims.

What is claimed is:

1. An apparatus for optically modulating computer data and electronic signals, the apparatus comprising:
   a light source, for generating a light beam which can be focused in a plurality of directions;
   a light sensor, optically coupled to the light source, for generating a sensor signal directly proportional to each of the plurality of directions of the light beam; and
   a modulating means, coupled to the light sensor, for modulating a variable in response to the sensor signal.

2. The apparatus of claim 1 wherein when the light beam is focused in one of the plurality of directions, the light beam is concentrated on one of a plurality of areas on the light sensor.

3. The apparatus of claim 1 wherein:
   the light source comprises a plurality of light sources each generating an individual light frequency; and
   the light sensor comprises a plurality of light sensors for receiving each individual light frequency.

4. The apparatus of claim 1 wherein:
   the light sensor comprises a plurality of light sensors, each disposed to receive a portion of the light, for generating a plurality of sensor signals in response to the portion of the light detected from the light source; and
   the modulating means, modulates variables in response to the plurality of sensor signals.

5. The apparatus of claim 4 further comprising:
   a display, coupled to the modulating means, for displaying a representation of a three dimensional image;
   wherein variables represent an X-cursor-position, a Y-cursor-position, and a Z-cursor-position on the three dimensional image on the display.

6. The apparatus of claim 4 further comprising:
   a robotic device, coupled to the modulating means, operating in a three dimensional space;
   wherein variables represent a right/left motion, an up/down motion, and a forward/backward motion in the three dimensional space.

7. The apparatus of claim 4 further comprising:
   a virtual reality device, coupled to the modulating means, operating in a virtual space;
   wherein variables represent a plurality of data variables in the virtual space.

8. The apparatus of claim 1 wherein the modulating means further comprises a software module for modulating a magnitude of the variable based on a rate of change in a magnitude of the sensor signal.

9. The apparatus of claim 1 wherein the modulating means further comprises a software module for modulating a magnitude of the variable based on a change in a magnitude of the sensor signal.

10. The apparatus of claim 1 wherein the modulating means further comprises a software module for modulating a rate of change of the variable based on the change in a magnitude of the sensor signal.

11. The apparatus of claim 1 further comprising a freeze unit, coupled to the modulating means, for preventing the modulating means from modulating the variable when changes in the sensor signal are greater than a predetermined maximum change.

12. The apparatus of claim 1 further comprising a freeze unit, coupled to the modulating means, for preventing the modulating means from modulating the variable when changes in the sensor signal are less than a predetermined minimum change.

13. The apparatus of claim 1 further comprising a reflector, optically coupling the light source to the light sensor, for modulating the light received by the light sensor in response to movement of the reflector.

14. The apparatus of claim 13 further comprising a plurality of reflectors, each optically coupling the light source to the light sensor, for modulating the light received by the light sensor in response to movement of the reflectors.

15. The apparatus of claim 13 further comprising a shell, flexibly coupling the reflector to the light sensor, so that the reflector may reflect light to different portions of the light sensor.

16. The apparatus of claim 13 further comprising:
   a movement means; and
   a strap, coupling the reflector to the movement means, so that the reflector may reflect light to different portions of the light sensor.

17. The apparatus of claim 1 wherein the variables are computer data values.

18. The apparatus of claim 1 wherein the variables are computer display parameters.

19. The apparatus of claim 1 wherein the variables are electronic signals.

20. An apparatus for optically modulating computer data and electronic signals, the apparatus comprising:

a light source, for generating a light beam with a plurality of light energies;

a light sensor, coupled to the light source, for generating a sensor signal directly proportional to each of the plurality of light energies of the light beam; and a modulating means, coupled to the light sensor, for modulating a variable in response to the sensor signal.

21. A computer-implemented method for optically modulating computer data and electronic signals, comprising the steps of:

generating a light beam which can be focused in a plurality of directions;

optically coupling the light beam to a light sensor;

generating a sensor signal directly proportional to each of the plurality of directions of the light beam; and modulating a variable in response to the sensor signal.

22. The method of claim 21 wherein the modulating step includes the step of modulating a magnitude of the variable based on a rate of change in a magnitude of the sensor signal.

23. The method of claim 21 wherein the modulating step includes the step of modulating a magnitude of the variable based on a change in a magnitude of the sensor signal.

24. The method of claim 21 wherein the modulating step includes the step of modulating a rate of change of the variable based on the change in a magnitude of the sensor signal.

25. The method of claim 21 further including the step of inhibiting modulation of the variable when changes in the sensor signal are greater than a predetermined maximum change.

26. The method of claim 21 further including the step of inhibiting modulation of the variable when changes in the sensor signal are less than a predetermined minimum change.

27. A computer-implemented method for optically modulating computer data and electronic signals, comprising the steps of:

generating a light beam with a plurality of light energies;

optically coupling the light beam to a light sensor;

generating a sensor signal directly proportional to each of the plurality of light energies of the light beam; and modulating a variable in response to the sensor signal.

28. An apparatus for optically modulating computer data and electronic signals, the apparatus comprising:

means for generating a light beam which can be focused in a plurality of directions;

means for optically coupling the means for generating a light beam to a means for sensing the light beam;

means for generating a sensor signal directly proportional to each of the plurality of directions of the light beam; and means for modulating a variable in response to the sensor signal.

29. The apparatus of claim 28 wherein the means for modulating includes means for modulating a magnitude of the variable based on a rate of change in a magnitude of the sensor signal.

30. The apparatus of claim 28 wherein the means for modulating includes means for modulating a magnitude of the variable based on a change in a magnitude of the sensor signal.

31. The apparatus of claim 28 wherein the means for modulating includes means for modulating a rate of change of the variable based on the change in a magnitude of the sensor signal.

32. The apparatus of claim 28 further including means for inhibiting modulation of the variable when changes in the sensor signal are greater than a predetermined maximum change.

33. The apparatus of claim 28 further including means for inhibiting modulation of the variable when changes in the sensor signal are less than a predetermined minimum change.

34. An apparatus for optically modulating computer data and electronic signals, the apparatus comprising:

means for generating a light beam with a plurality of light energies;

means for optically coupling the means for generating a light beam to a means for sensing the light beam;

means for generating a sensor signal directly proportional to each of the plurality of light energies of the light beam; and means for modulating a variable in response to the sensor signal.

* * * * *